United States Patent [19]

Häfner

[11] Patent Number: 4,965,729
[45] Date of Patent: Oct. 23, 1990

[54] METHOD AND APPARATUS FOR IMPROVING THE OPERATIONAL CHARACTERISTICS OF A VEHICLE

[75] Inventor: Hans W. Häfner, Aichach-Walchshofen, Fed. Rep. of Germany

[73] Assignee: Pfister GmbH, Augsburg, Fed. Rep. of Germany

[21] Appl. No.: 204,328

[22] Filed: Jun. 9, 1988

[30] Foreign Application Priority Data

Jun. 10, 1987 [DE] Fed. Rep. of Germany ....... 3719320

[51] Int. Cl.$^5$ .......................... B60T 8/32; G06F 15/50
[52] U.S. Cl. ........................... 364/426.03; 364/429.01; 180/197; 303/108; 303/100
[58] Field of Search ...................... 364/426.01, 426.02, 364/425, 565, 426.03; 73/105, 146; 303/93, 108, 100, 107; 180/197

[56] References Cited

U.S. PATENT DOCUMENTS

| | | | |
|---|---|---|---|
| 3,677,094 | 7/1972 | Kupfmuller | 364/565 |
| 3,719,246 | 3/1973 | Bott | 180/197 |
| 4,392,202 | 7/1983 | Matsuda | 364/426.02 |
| 4,606,586 | 8/1986 | Eckert et al. | 303/100 |
| 4,621,705 | 11/1986 | Etoh | 364/456 |
| 4,670,845 | 6/1987 | Etoh | 364/461 |
| 4,701,855 | 10/1987 | Fennel | 364/426.02 |
| 4,763,263 | 8/1988 | Leiber | 180/197 |

FOREIGN PATENT DOCUMENTS

3435866A1  4/1986  Fed. Rep. of Germany.

Primary Examiner—Parshotam S. Lall
Assistant Examiner—V. Trans

[57] ABSTRACT

A method and apparatus for improving the operation of a vehicle detects unevennesses of the road on which the vehicle is moving by sensing oscillations at two positions of the vehicle arranged in spaced relationship behind each other in the direction of movement of the vehicle. The actual speed of the vehicle is determined by correlating the oscillations sensed and by multiplying the time delay therebetween with the distance of the two positions. The slippage of the wheels, which is an important parameter in particular for braking the vehicle, may be calculated by setting the determined actual speed into relation to the speed of the vehicle as derived from the rotary speed of the wheels. The vehicle may be controlled in dependence of this slippage and other parameters derived from the actual speed, the slippage and forces vertically acting onto the wheels of the vehicle.

19 Claims, 3 Drawing Sheets

METHOD AND APPARATUS FOR IMPROVING THE OPERATIONAL CHARACTERISTICS OF A VEHICLE

TECHNICAL FIELD

The invention relates to a method and an apparatus for improving the operational characteristics of a vehicle, in particular an automobile by determining the actual speed of the vehicle and the rotational speed of its wheels and using any differences therebetween for controlling the operation of the vehicle.

BACKGROUND ART

Usually, the speed of a vehicle is derived from the rotational speed of a wheel thereof. However, due to the slippage of the wheels such speed measurement is rather inexact, in particular during braking of the vehicle. Now, automatic braking systems have been introduced in the recent years. These systems are based on the behaviour of the wheels which might be quite different from that of the movement of the vehicle when there is a remarkable slippage.

The German Laid Open Patent Publication No. 34 35 866 discloses a method for determining the actual speed of a vehicle. In order to avoid any influence of the slippage between the wheels of the vehicle and the road it is proposed to pick-up the oscillations of the wheels caused by the road unevenness and to determine the actual absolute speed of the vehicle by evaluating the time difference of the oscillations of the front and rear wheels.

The German Laid Open Patent Publication No. 27 51 012 discloses an apparatus for determining the speed of a vehicle by means of two transducers arranged in a fixed distance in the direction of movement of the vehicle. The transducers generate electrical signals reflecting unevennesses of the road surface. The signals of the two transducers are correlated with each other for determining the time delay therebetween which is multiplied by the fixed distance in order to determine the actual speed. The vehicle is further provided with a measuring device for determining the distance covered by the vehicle. This device is operated by the rotation of the wheel. The reading of the distance measuring device is corrected by the integrated signal of the determined actual speed.

The German Laid Open Patent Publication No. 28 49 028 discloses a similar device for determining the actual speed of a vehicle by cross-correlating signals derived from sensors arranged at a pre-determined distance in the direction of movement of the vehicle. Specifically, mechanical-to-electrical transducers are used formed by strain gauges, force or acceleration pick-up devices provided at the wheel suspensions, the springs or shock-absorbers or bumpers of the vehicle.

SUMMARY OF THE INVENTION

It is an object of the instant invention to provide a method and an apparatus for optimizing the operation of a vehicle.

It is a further object of the present invention to provide a method and an apparatus for improving the operation of a vehicle in extreme situations as the braking of the vehicle.

These and other objects of the instant invention are achieved by a method for improving the operational characteristics of a vehicle provided with wheels arranged behind each other in a moving direction of the vehicle comprising the steps of determining a first speed of movement of the vehicle dependent on the rotary speed of at least one of the wheels;

sensing first oscillations at a first position of the vehicle, caused by the vehicle passing over unevennesses of a road during movement;

sensing second oscillations at a second position of the vehicle located at a fixed distance behind the first position in the moving direction, caused by the unevennesses of the road;

correlating the first and second oscillations for determining a time delay therebetween;

calculating a second speed of the movement of the vehicle from the fixed distance between the first and second positions and the time delay; and setting the first and second speeds into relation to each other.

According to another aspect of the invention an apparatus for improving the operational characteristics of a vehicle provided with wheels arranged in a fixedly spaced relationship to each other in a direction of movement of the vehicle comprises:

a device for determining a first speed of movement of the vehicle in dependence on the rotary speed of at least one of the wheels;

a device for sensing first oscillations at a first position of the vehicle, caused by the vehicle passing unevennesses of a road during movement;

a device for sensing second oscillations and a second position of the vehicle located at a first distance behind the first position in the moving direction, caused by the unevennesses of the road;

a device for correlating the first and second oscillations for determining a time delay therebetween;

a device for calculating a second speed of the movement of the vehicle from the fixed distance between the first and second positions and the time delay; and a device for setting the first and second speeds into relation to each other.

DESCRIPTION OF A PREFERRED EMBODIMENT OF THE INVENTION

Figure 1:
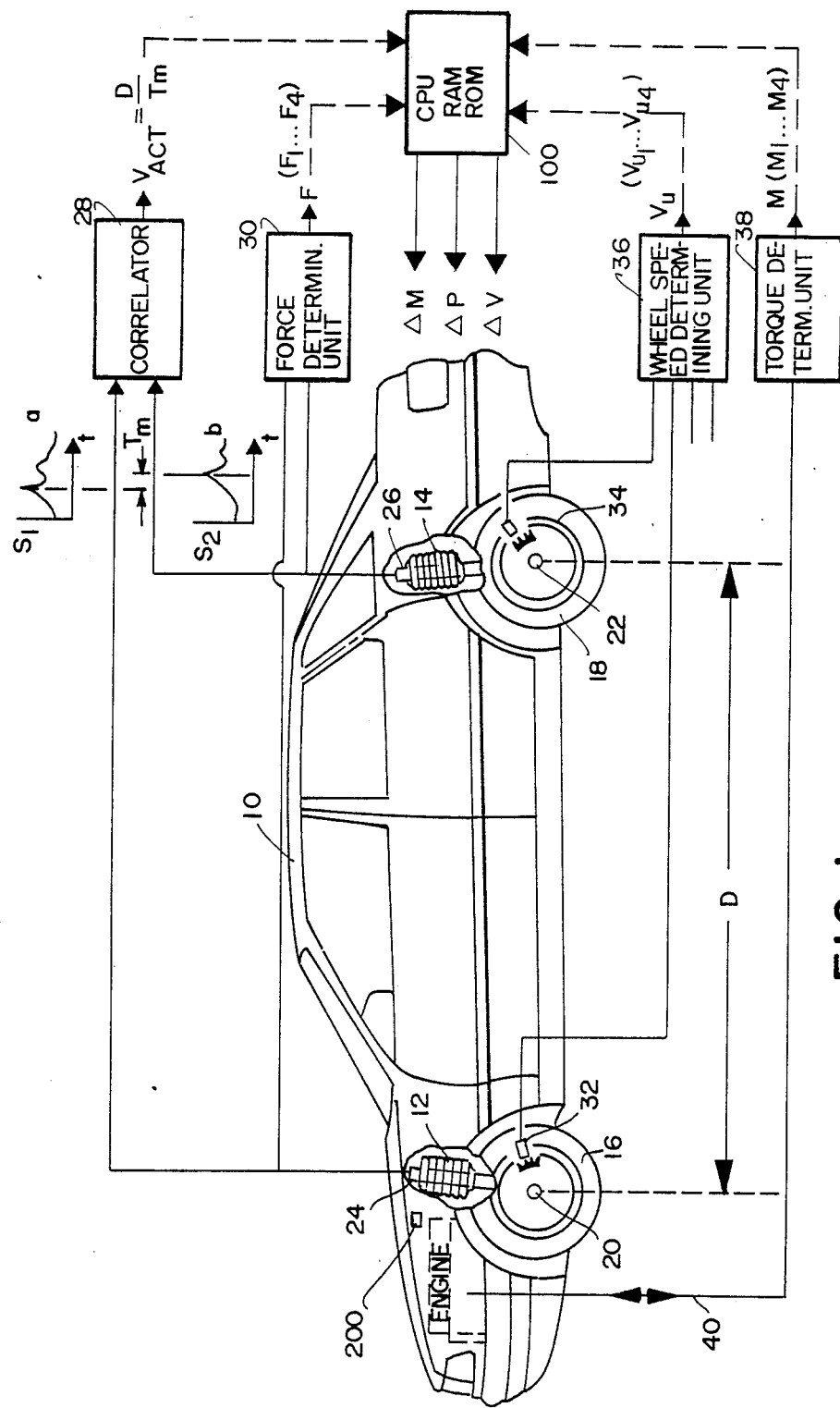
FIG. 1 is a schematic view of an apparatus according to the invention as used in connection with a motor car.

According to FIG. 1 a motor car 10 of the embodiment is provided with front spring legs 12 (left and right) and rear spring legs 14 for suspension by means of a front wheel axle 20 and a rear wheel axle 22 of the front wheels 16 and the rear wheels 18, respectively. The spring legs 12, 14 support via force measuring devices 24 and 26, respectively, on the body of the motor car as indicated in more detail in FIG. 2.

Further details of the arrangement of a spring leg having integrated a force measuring device as used with the embodiment have been disclosed in the International Patent Application Publication WO/87/02129 (U.S. patent application, Ser. No. 057,892 of May 21, 1987 now U.S. Pat. No. 4,830,399) which in its entirety is made contents of the instant patent application. The force measuring device used has the particular advantage that any lateral forces are eliminated and that signals are produced representing the exact value of the forces exerted onto the wheel. As well-known in the art such as U.S. Pat. Nos. 4,606,580 or 4,392,202, these signals are processed in an evaluating device 30 (i.e., a force determining device) in conection with a board computer 100 for various purposes for instance for adjusting the spring characteristic of the spring legs 12, 14 in dependence on the load put into the motor car. The device 30 converts the force signals from devices 24, 26 into signals which can be used for processing by computer 100.

The force measuring devices 24, 26 are used for determining the actual car speed, in that they pick-up oscillations caused by any unevennesses of the road. The oscillations are illustrated in a simplified manner in the diagrams (a) and (b). The oscillations $S_2$ caused by the rear wheel 18 are time-delayed by the time $T_M$ in respect of the oscillations $S_1$ of the front wheel 16. The oscillations $S_1$ and $S_2$ are illustrated very simplified only. In reality, these oscillations are rather irregular excursions which are applied to a correlator 28 (such as German Laid Open Publication 3435866 mentioned above) to be correlated in well-known manner in order to determine the delay $T_M$. Consideriną a fixed distance D between the front and rear axles 20, 22 the actual speed may be determined very accurately (see Step 1 of FIG. 3).

With the preferred embodiment of the invention force measuring devices 24, 26 are used as disclosed in the above mentioned International Patent Application WO 87/02129. However, other types of force measuring devices such as piezo-electric force sensors may be used as well. Due to the high processing speeds of a board computer, the momentary actual speed is immediatedly available as an exact value and may be compared with the rotary speed of one of the wheels as derived in a well known manner via a pulse generator or the like. The result of this comparison is a measure for the slippage between the wheels and the road, which in turn is a characteristic value indicating prior to a brake operation, i.e. in the acceleration or rolling phase of a car, changes in the road characteristics, for instance icy places. This parameter may then be used for automatic control of the actual speed or for indicating a critical situation to the driver (such as acceleration/declaration, increasing/decreasing braking pressure, opening/closing the throttle valve).

FIG. 1 shows usual sensors 32, 34 provided at the wheels 16, 18 for determining the actual rotary speed $V_U(V_{U1}, \ldots V_{U4})$ of the wheels (see Step 2 of FIG. 3) as they are used in a well-known manner in automatic braking systems (where the wheel rotary speed $V_U = 2\pi r n$, r is the radius of the wheel and n is the revolution number (rpm)). Up to now, this rotary speed of the wheels has been used solely for determining the speed of the motor car with the consequence that in particular with difficult road situations a considerable slippage has falsified the actual speed value of the car. FIG. 1 shows a unit 36 used for generating a mean or average speed $V_U$ on the basis of the rotary speeds of the four wheels such as U.S. Pat. No. 3,677,094 using mechanical elements or U.S. Pat. No. 4,362,202 using optical elements.

Figure 3:
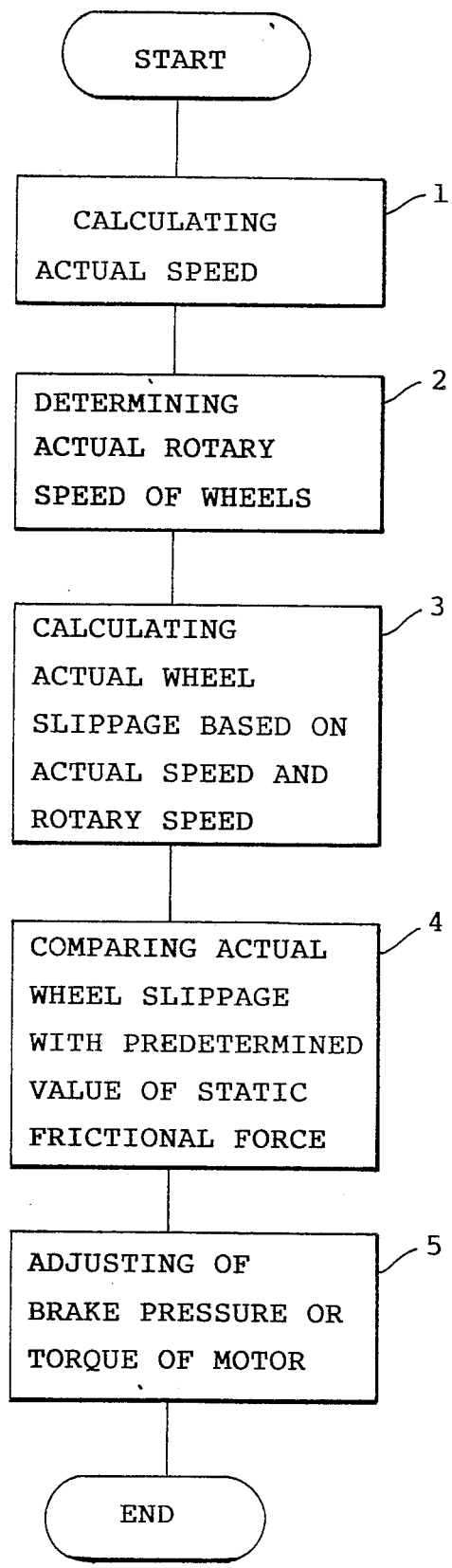
FIG. 3 is a diagram of how the board computer controls the functions of a vehicle.

Now, by comparing the mean rotary speed $V_U$ with the determined actual speed $V_{ACT}(V_{ACT}=D/T_M$ where D is the distance between the front axle and the rear axle and $T_M$ is the time delay between oscillations of the front wheel and the rear wheel) the actual slippage (i.e., $F_S = (V_{ACT} - V_U)/V_{ACT}$) of the wheels 16, 18 on the road may be determined (see Step 3 of FIG. 3). Alternatively, the individual rotary speeds $V_{U1} \ldots, V_{U4}$ may be compared with the actual speed $V_{ACT}$ and the slippage of each wheel may be determined individually.

For an optimized starting and braking of a motor car as shown in FIG. 4 in Step 4 it is essential that the actual slippage does not exceed a predetermined value, for instance 5%; otherwise, the static friction changes to a sliding friction with the result of a suddenly and considerably reduced friction number.

Therefore, with the actual slippage exactly determined as explained above the torque of the motor ($\Delta M$) or the brake pressure ($\Delta P$), respectively (see Step 5 of FIG. 3), may be controlled such that that the static friction number is maintained and that there is no change to a sliding friction. It is essential that changes in slippage due to a change in road condition are recognized before braking.

For a still further improved automatic control of the operation of the motor car in addition to the forces $F_1$ to $F_4$ exerted onto the wheels by means of the force measuring devices 24, 26 the individual moments $M_1$ to $M_4$ acting on the individual wheels 16, 18 may be determined by a well-known unit 38 such as U.S. Pat. No. 4,621,705. Averaging moments $M_1$ to $M_4$ results in a mean or average moment M which enables the calculation of the frictional force $F_F$ and, in particular the static frictional force $F_{Fs}$ as long as there is no remarkable slippage. In consideration of the individual forces $F_1$ to $F_4$ acting on the wheels the static friction number $R_s$ may be calculated which is valid until a pre-determined slippage is exceeded. The driving moment or torque of the motor or the brake moment, respectively, acting on the car wheels are then controlled (i.e., reducing or increasing braking pressure, opening or closing the throttle valve or acceleration/deceleration) such that the condition of the static friction is maintained. Furthermore, it is now possible to adjust the actual car speed by means on these values in order to maintain a pre-determined braking distance.

With a further improvement of the method and the apparatus of the invention the motor car may be provided with a distance measuring apparatus acting in driving direction, for instance a radar device 50 such as U.S. Pat. No. 4,621,705, Japanese Patent No. 55-8600, U.S. Pat. Nos. 3,689,882 or 3,952,301. In addition to the parameters as determined according to the above explanations the momentary distance from another car driving in front or from a fixed object may be determined and used to control the car speed by acceleration/deceleration (i.e., opening or closing the throttle valve) or braking (i.e., reducing or increasing braking pressure).

Figure 2:
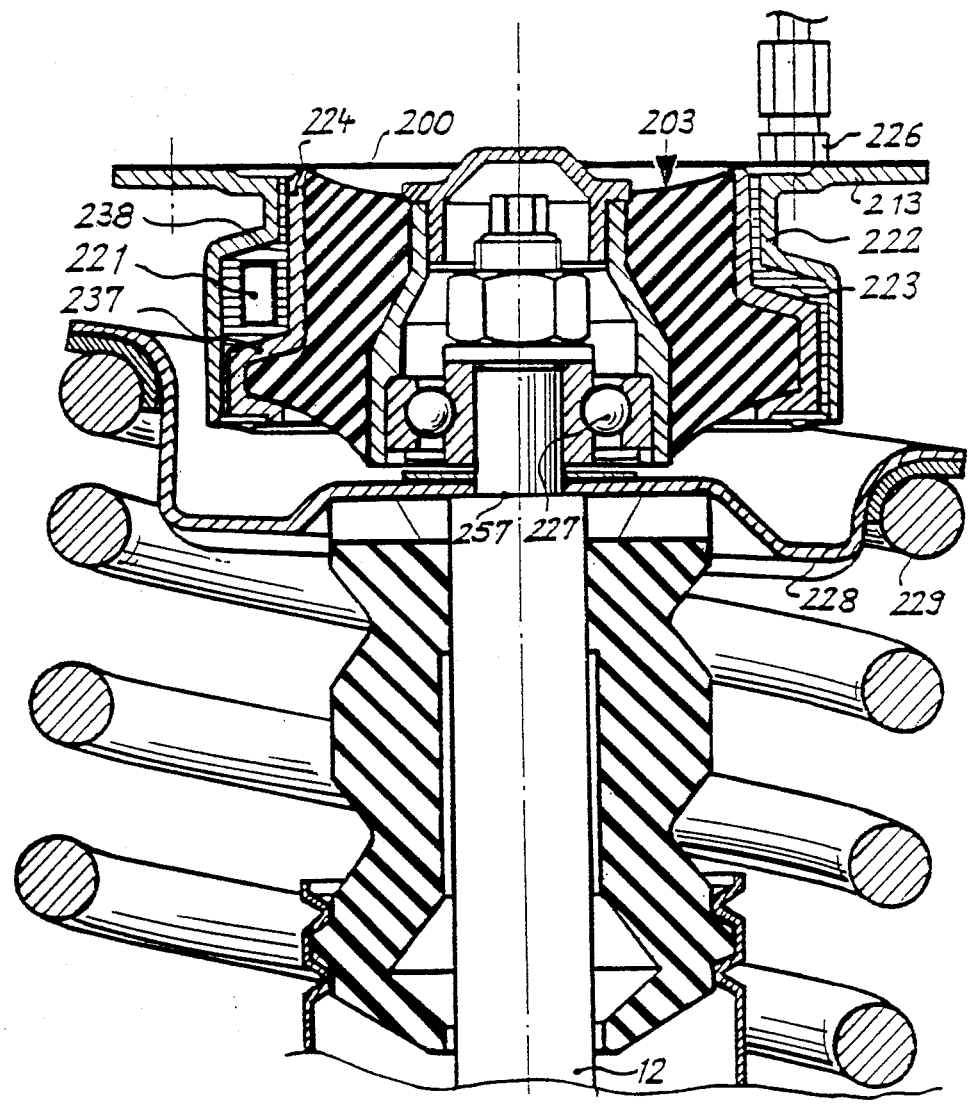
FIG. 2 is a sectional view of an exemplary arrangement of a force sensor included in a motor car wheel suspension.

Furthermore, by means of the board computer 100 with the actual speed as determined according to the above description the speed of the car may be adjusted to a set fixed value. The friction number R determined from the accelerating or braking moment M and the wheel force F may generally be used for indicating the condition of the road by comparing the determined friction number with stored values and using this comparison for appropriate controls and indications. FIG. 2 shows an embodiment of a wheels suspension in more detail. The force measuring devices 24, 26 of FIG. 1 are represented by at least one pressure sensor 221 arranged between the spring leg 12 or 14, respectively, and a car body 200 such that the pressure sensor 221 operates as a wheel load sensor.

Specifically, the pressure sensor 221 is embedded in elastomeric material 223 in a widened annular space 238 between concentric cylindrical housings 222 and 237. The housing 237 is integral to an outer wall 224 of a spring leg bearing 203 receiving the spring leg 12 or, respectively, a piston rod 257 in bearing 227 in a pivotal manner. A spring 229 of the spring leg 12 supports on a spring disk 228. The housing 222 is integral to a flange 213 fixed by means of screws 226 to the car body 200.

It is of particular advantage of the force measuring devices provided in the suspension of the spring legs according to FIG. 2 are used both for sensing the oscillations for measuring the actual speed and for determining the wheel force F. Thus, these force measuring devices have a double function. Furthermore, these force measuring devices may be used for picking-up accelerations, as longitudinal and lateral accelerations giving an information in respect of the response of the car, in particular its inclination when bending-off.

A continuous measurement of the values explained before enables a considerable improvement of the operation of vehicles.

From the degree of correlation of the oscillations $S_1$ and $S_2$ conclusions are possible in respect to the inclination of the vehicle. Therefore, an oversteering or understeering may be determined and corrected.

With the embodiment as explained above the moments $M_1$ to $M_4$ of the individual wheels are determined. As far as these wheels are synchronized such that the same moment acts on them the driving torque derived from the motor may be used as a parameter as indicated with line 40 in FIG. 1.

With the preferred embodiment the detection of the oscillations is made by force measuring devices. Alternatively, acceleration measuring devices may be used.

As regards the evaluation of the picked-up oscillations various known methods may be used as analog methods using integration or digital methods using sampling of the oscillations followed by a digital processing.

Since the momentary actual speed may be determined very accurately by integrating over the driving time of the vehicle the exact driving distance may be determined.

Though the preferred embodiment relates to a usual motor car the invention is equally applicable for trucks, track-bound vehicles and any other type of vehicle including motor cycles. It may even be used for airplanes as far as the latter are provided with wheels aligned and spaced in moving direction.

From the above description it may be gathered that the method and apparatus according to the invention results in a considerable and suprising advantage with the operation of vehicles in particular motor cars. In particular, an automatic control of the operation of the vehicle is now possible using parameters as determined according to the invention or derived therefrom in a very accurate manner.

The invention as been explained, by way of example in such a manner that the individual parameters are determined step by step. However, a skilled person will appreciate that by means of a suitable computer program determining of intermediate values may be skipped or that the processing may be accomplished in parallel.

What is claimed is:

1. A method for improving the operational characteristics of a vehicle provided with wheels arranged behind each other in a moving direction of the vehicle comprising the steps of:
   determining a first speed of movement of the vehicle dependent on the rotary speed of at least one of said wheels;
   sensing first oscillations at a first position of said vehicle, caused by said vehicle passing over unevennesses of a road during movement;
   sensing second oscillations at a second position of said vehicle located at a fixed distance behind said first position in said moving direction, caused by said unevennesses of said road;
   correlating said first and second oscillations for determining a time delay therebetween;
   calculating a second speed of the movement of said vehicle from said fixed distance between said first and second positions and said time delay;
   setting said first and second speeds into relation to each other;
   determining a slippage of said wheel from said relation by comparing said first and second speeds of said vehicle; and
   controlling a momentary speed of movement of said vehicle in dependence on said slippage exceeding a predetermined slippage value.

2. The method of claim 1 further comprising the steps:
   measuring the momentary force vertically acting on at least one wheel; and
   setting said force into relation to said slippage.

3. The method of claim 2 further comprising the steps:
   determining a driving moment acting on at least one of said wheels; and
   setting said driving moment into relation to said slippage in dependence on the said force acting on said wheel in order to determine a momentary friction number between said wheel and said road.

4. The method of claim 3 further comprising the step:
   controlling a momentary speed of movement of said vehicle in dependence on said friction number effective between said wheels and said road.

5. The method of claim 4 further comprising the step:
   measuring a momentary distance of said vehicle from an object in front of said vehicle for controlling said actual speed in dependence on said slippage and said friction number.

6. The method of claim 1 wherein an inclination of said vehicle is determined in dependence on a degree of said correlation between said first and second oscillations of said individual wheels.

7. The method of claim 1 wherein individual values in respect of said first and second speeds, an acceleration or deceleration of said wheels and a force vertically acting on said wheels, of said individual wheels are set into relation to each other and evaluated in common.

8. A method of improving the operation of a vehicle provided with wheels comprising the steps of:
   determining a momentary force acting on said wheels;
   determining a momentary acceleration/deceleration force acting on said vehicle;

setting determined resulting values into relation to each other; and controlling a momentary speed of movement of the vehicle in dependence on said momentary acceleration/deceleration force acting on said vehicle and said momentary force acting on said wheels by varying one of a driving torque of the engine and a braking torque of the wheels.

9. The method of claim 8 wherein individual values in respect of said first and second speeds, an acceleration or deceleration of said wheels and said force vertically acting on said wheels, of said individual wheels are set into relation to each other and evaluated in common.

10. An apparatus for improving the operational characteristics of a vehicle provided with wheels arranged in a fixedly spaced relationship to each other in a direction of movement of said vehicle comprising:

means for determining a first speed of movement of the vehicle in dependence on the rotary speed of at least one of said wheels;

means for sensing first oscillations at a first position of said vehicle, caused by said vehicle passing unevennesses of a road during movement;

means for sensing second oscillations at a second position of said vehicle locates at a first distance behind said first position in said moving direction, caused by said unevennesses of said road;

means for correlating said first and second oscillations for determining a time delay therebetween;

means for calculating a second speed of the movement of said vehicle from said fixed distance between said first and second positions and said time delay;

means for setting said first and second speeds into relation to each other and means for determining a slippage of said at least one wheel from the relation between said first and second speeds of the vehicle.

11. The apparatus of claim 10 further comprising:

means for measuring the momentary force vertically acting on at least one wheel; and means for setting said force into relation to said slippage.

12. The apparatus of claim 11, further comprising:

means for determining a driving moment acting on at least one of said wheels; and means for setting said driving moment into relation to said slippage in dependence on the said force acting on said wheel in order to determine a momentary friction number between said wheel and said road.

13. The apparatus of claim 12 further comprising:

means for controlling a momentary speed of movement of said vehicle in dependence on said friction number effective between said wheel and said road.

14. The apparatus of claim 13 further comprising:

means for measuring a momentary distance of said vehicle from an object in front of said vehicle for controlling said actual speed in dependence on said slippage and said friction number.

15. The apparatus of claim 14 further comprising:

means for determining an inclination of said vehicle in dependence on a degree of said correlation between said first and second oscillations of said individual wheels.

16. The apparatus of claim 15 further comprising:

means for setting individual values in respect of said first and second speeds, an acceleration or deceleration of said wheels and said force vertically acting on said wheels, of said individual wheels into relation to each other and for evaluating them in common.

17. Apparatus of claim 10 wherein said means for sensing said first and second oscillations are force measuring devices integrated in spring legs of said vehicle.

18. Apparatus of claim 17 wherein said spring legs comprise two concentric housings forming a cylindrical gap therebetween a complementary step each being provided at a interior peripheral surface of said outer housing and said outer peripheral surface of said inner housing forming a space therebetween, said space and said gap being filled with elastomeric material and said force measuring devices being arranged in said space embedded in said elastomeric material.

19. An apparatus of improving the operation of a vehicle provided with wheels comprising:

means for determining a momentary force acting on said wheels;

means for determining a momentary acceleration/deceleration force acting on said vehicle;

means for setting determined resulting values into relation to each other; and means for controlling a momentary speed of movement of said vehicle in dependence on said determined momentary acceleration/deceleration force acting on said vehicle and said momentary force acting on said wheels by varying one of a driving torque of the engine and a braking torque of the wheels.

* * * * *